US008581554B2

(12) United States Patent
Saligram et al.

(10) Patent No.: US 8,581,554 B2
(45) Date of Patent: Nov. 12, 2013

(54) BATTERY CHARGING METHOD AND APPARATUS

(75) Inventors: Narayana Prakash Saligram, Bangalore (IN); Sreejakumar Sreekantan Nair, Karnataka (IN); Ramakrishnan Madenoor Krishnan, Karnataka (IN); Milind Dighrasker, Karnataka (IN)

(73) Assignee: Schneider Electric IT Corporation, West Kingston, RI (US)

( * ) Notice: Subject to any disclaimer, the term of this patent is extended or adjusted under 35 U.S.C. 154(b) by 781 days.

(21) Appl. No.: 12/500,877

(22) Filed: Jul. 10, 2009

(65) Prior Publication Data

US 2011/0006737 A1    Jan. 13, 2011

(51) Int. Cl.
*H02J 7/00* (2006.01)
(52) U.S. Cl.
USPC .......................................... 320/134; 320/132
(58) Field of Classification Search
USPC ....................................................... 320/134
See application file for complete search history.

(56) References Cited

U.S. PATENT DOCUMENTS

| 3,940,679 A | 2/1976 | Brandwein et al. |
| 4,139,846 A | 2/1979 | Conforti |
| 4,217,645 A | 8/1980 | Barry et al. |
| 4,303,877 A | 12/1981 | Meinhold |
| 4,331,911 A | 5/1982 | Park |
| 4,346,151 A | 8/1982 | Uba et al. |
| 4,394,741 A | 7/1983 | Lowndes |
| 4,684,872 A | 8/1987 | Stewart |
| 4,707,795 A | 11/1987 | Alber et al. |
| 4,709,202 A | 11/1987 | Koenck et al. |
| 4,746,854 A | 5/1988 | Baker et al. |
| 4,820,966 A | 4/1989 | Fridman |
| 4,843,299 A | 6/1989 | Hutchings |
| 4,885,523 A | 12/1989 | Koenck |
| 4,918,368 A | 4/1990 | Baker et al. |
| 4,947,123 A | 8/1990 | Minezawa |
| 4,949,046 A | 8/1990 | Seyfang |

(Continued)

FOREIGN PATENT DOCUMENTS

| WO | 94/01914 A1 | 1/1994 |
| WO | 2008/056316 A1 | 5/2008 |

OTHER PUBLICATIONS

International Preliminary Report on Patentability for PCT/US2010/041345, dated Jan. 10, 2012.

*Primary Examiner* — Drew A Dunn
*Assistant Examiner* — Robert Grant
(74) *Attorney, Agent, or Firm* — Lando & Anastasi, LLP

(57) ABSTRACT

Disclosed are methods for charging batteries utilizing a charge balance approach, and charger systems using those methods. In one example, a method for charging a battery includes monitoring an amount of charge released by the battery while in a discharge state, recording the amount of charge released while in the discharge state, applying a voltage which results in current in reverse direction to the battery at a first voltage level for a time sufficient to introduce an amount of charge substantially equal to the recorded amount of charge released by the battery while in the discharge state, and maintaining the battery in a stand-by mode by applying a voltage which results in current in reverse direction to the battery at a second voltage level, the second voltage level being in a range sufficient to prevent self-discharge of the battery and insufficient to induce evaporation of electrolyte in the battery.

21 Claims, 12 Drawing Sheets

(56) References Cited

U.S. PATENT DOCUMENTS

| | | | |
|---|---|---|---|
| 4,961,043 | A | 10/1990 | Koenck |
| 4,965,738 | A | 10/1990 | Bauer et al. |
| 5,027,294 | A | 6/1991 | Fakruddin et al. |
| 5,043,651 | A | 8/1991 | Tamura |
| 5,047,961 | A | 9/1991 | Simonsen |
| 5,049,804 | A | 9/1991 | Hutchings |
| 5,057,383 | A | 10/1991 | Sokira |
| 5,130,659 | A | 7/1992 | Sloan |
| 5,136,231 | A | 8/1992 | Faulk |
| 5,148,043 | A | 9/1992 | Hirata et al. |
| 5,151,644 | A | 9/1992 | Pearson et al. |
| 5,153,496 | A | 10/1992 | LaForge |
| 5,159,272 | A | 10/1992 | Rao et al. |
| 5,200,689 | A | 4/1993 | Interiano et al. |
| 5,206,578 | A | 4/1993 | Nor |
| 5,218,288 | A | 6/1993 | Mickal et al. |
| 5,252,906 | A | 10/1993 | Busson |
| 5,254,928 | A | 10/1993 | Young et al. |
| 5,266,880 | A | 11/1993 | Newland |
| 5,278,487 | A | 1/1994 | Koenck |
| 5,281,955 | A | 1/1994 | Reich et al. |
| 5,283,512 | A | 2/1994 | Stadnick et al. |
| 5,302,858 | A | 4/1994 | Folts |
| 5,315,228 | A | 5/1994 | Hess et al. |
| 5,321,626 | A | 6/1994 | Palladino |
| 5,321,627 | A | 6/1994 | Reher |
| 5,325,041 | A | 6/1994 | Briggs |
| 5,345,163 | A | 9/1994 | Gibbons et al. |
| 5,349,282 | A | 9/1994 | McClure |
| 5,349,535 | A | 9/1994 | Gupta |
| 5,381,350 | A | 1/1995 | Fiorina et al. |
| 5,382,893 | A | 1/1995 | Dehnel |
| 5,422,558 | A | 6/1995 | Stewart |
| 5,455,499 | A | 10/1995 | Uskali et al. |
| 5,459,671 | A | 10/1995 | Duley |
| 5,462,439 | A | 10/1995 | Keith |
| 5,498,950 | A | 3/1996 | Ouwerkerk |
| 5,504,415 | A | 4/1996 | Podrazhansky et al. |
| 5,510,690 | A | 4/1996 | Tanaka et al. |
| 5,543,667 | A | 8/1996 | Shavit et al. |
| 5,666,040 | A | 9/1997 | Bourbeau |
| 5,686,768 | A | 11/1997 | Thomsen et al. |
| 5,686,815 | A | 11/1997 | Reipur et al. |
| 5,739,667 | A | 4/1998 | Matsuda et al. |
| 5,808,445 | A | 9/1998 | Aylor et al. |
| 5,818,201 | A | 10/1998 | Stockstad et al. |
| 5,883,497 | A | 3/1999 | Turnbull |
| 5,920,181 | A | 7/1999 | Alberkrack et al. |
| 5,965,996 | A | 10/1999 | Arledge et al. |
| 5,969,436 | A | 10/1999 | Chalasani |
| 5,994,878 | A * | 11/1999 | Ostergaard et al. ............ 320/132 |
| 6,002,237 | A | 12/1999 | Gaza |
| 6,031,354 | A | 2/2000 | Wiley et al. |
| 6,075,339 | A * | 6/2000 | Reipur et al. .................. 320/110 |
| 6,169,669 | B1 | 1/2001 | Choudhury |
| 6,184,655 | B1 | 2/2001 | Malackowski |
| 6,268,711 | B1 | 7/2001 | Bearfield |
| 6,274,950 | B1 | 8/2001 | Gottlieb |
| 6,329,792 | B1 | 12/2001 | Dunn et al. |
| 6,373,225 | B1 | 4/2002 | Haraguchi et al. |
| 6,404,166 | B1 * | 6/2002 | Puchianu ...................... 320/116 |
| 6,424,119 | B1 | 7/2002 | Nelson et al. |
| 6,437,542 | B1 | 8/2002 | Liaw et al. |
| 6,469,471 | B1 | 10/2002 | Anbuky et al. |
| 6,522,101 | B2 | 2/2003 | Malackowski |
| 6,549,014 | B1 | 4/2003 | Kutkut et al. |
| 6,584,329 | B1 | 6/2003 | Wendelrup et al. |
| 6,700,351 | B2 * | 3/2004 | Blair et al. .................... 320/125 |
| 6,803,678 | B2 | 10/2004 | Gottlieb et al. |
| 6,812,670 | B2 | 11/2004 | Minamiura et al. |
| 6,864,666 | B2 | 3/2005 | Breen et al. |
| 6,885,168 | B2 | 4/2005 | Okumura et al. |
| 6,888,468 | B2 | 5/2005 | Bertness |
| 6,928,568 | B2 | 8/2005 | Breen et al. |
| 6,983,212 | B2 | 1/2006 | Burns |
| 6,992,464 | B2 | 1/2006 | Takano et al. |
| 7,045,989 | B2 | 5/2006 | Sakakibara et al. |
| 7,057,308 | B2 | 6/2006 | Stranberg et al. |
| 7,132,833 | B2 | 11/2006 | Layden et al. |
| 7,196,494 | B2 | 3/2007 | Baumgartner |
| 7,199,489 | B2 | 4/2007 | Gottlieb et al. |
| 7,202,576 | B1 | 4/2007 | Dechene et al. |
| 7,400,113 | B2 | 7/2008 | Osborne |
| 7,612,472 | B2 | 11/2009 | Mutabdzija et al. |
| 2001/0009361 | A1 | 7/2001 | Downs et al. |
| 2001/0012579 | A1 | 8/2001 | Vackar |
| 2001/0033502 | A1 | 10/2001 | Blair et al. |
| 2002/0024332 | A1 | 2/2002 | Gardner |
| 2002/0136042 | A1 | 9/2002 | Layden et al. |
| 2002/0153865 | A1 * | 10/2002 | Nelson et al. ................. 320/152 |
| 2002/0194517 | A1 | 12/2002 | Cohen et al. |
| 2002/0195997 | A1 | 12/2002 | Peek et al. |
| 2003/0005339 | A1 | 1/2003 | Cohen et al. |
| 2003/0048006 | A1 | 3/2003 | Shelter et al. |
| 2003/0052644 | A1 | 3/2003 | Nelson et al. |
| 2004/0075343 | A1 | 4/2004 | Wareham et al. |
| 2004/0104706 | A1 | 6/2004 | Ooi et al. |
| 2004/0160210 | A1 | 8/2004 | Bohne et al. |
| 2004/0189248 | A1 | 9/2004 | Boskovitch et al. |
| 2004/0231875 | A1 | 11/2004 | Rasmusen et al. |
| 2004/0263123 | A1 | 12/2004 | Breen et al. |
| 2005/0001589 | A1 | 1/2005 | Edington et al. |
| 2005/0024016 | A1 | 2/2005 | Breen et al. |
| 2005/0162019 | A1 | 7/2005 | Masciarelli et al. |
| 2005/0162129 | A1 | 7/2005 | Mutabdzija et al. |
| 2005/0278075 | A1 | 12/2005 | Rasmussen et al. |
| 2006/0012341 | A1 | 1/2006 | Burns |
| 2006/0044846 | A1 | 3/2006 | Hjort et al. |
| 2006/0072262 | A1 | 4/2006 | Paik et al. |
| 2006/0192436 | A1 | 8/2006 | Stranberg et al. |
| 2007/0170892 | A1 * | 7/2007 | Ishii ............................. 320/132 |

* cited by examiner

BATTERY CHARGING METHOD AND APPARATUS

BACKGROUND OF INVENTION

1. Field of Invention

The present invention is in the field of battery technology and, more specifically, relates to charging profiles for batteries used in inverter applications such as in conjunction with uninterruptable power supply (UPS) systems, or other applications that involve sporadic charging of batteries.

2. Discussion of Related Art

The use of uninterruptible power supplies to provide regulated, uninterrupted power for sensitive and/or critical loads, such as computer systems and other data processing systems, is known. A number of different UPS products are available including those identified under the trade name Smart-UPS® from American Power Conversion Corporation (APC) of West Kingston, R.I. In a typical UPS, a battery is used to provide backup power for a critical load during blackout or brownout conditions. Some examples of UPS systems include flooded cell lead-acid batteries that are used to provide back-up power. It has been observed that in certain environments, flooded cell lead-acid batteries may provide reduced backup time and have shortened life span due to charge starvation, sulphation of the electrodes, and/or electrolyte loss when charged using conventional charge profiles, such as those commonly recommended by battery manufacturers.

One example of a conventional charge profile utilized by some battery chargers for charging flooded cell lead-acid batteries is illustrated in FIG. 1. The charge profile of FIG. 1 includes three regions of operation, as is typically recommended by battery manufacturers for flooded cell lead-acid batteries. In the first region, termed the constant current region (CC region 10), the battery charging current is substantially constant. In the CC region 10, the voltage across the terminals of the battery increases as charge is added to the battery. After the battery voltage reaches a certain level (VBOOST) at time 15, the profile changes to a second region of operation in which the voltage applied across the battery terminals is held constant. This region of operation is termed the constant voltage region (CV region). The CV region is divided in to two parts, namely, a boost region 20 and a float region 30. In the boost region 20, the charging voltage is maintained at a higher level than the open circuit voltage of the battery. After a predetermined amount of time in the boost region 20, terminating at time 25, the voltage applied across the terminals of the battery is reduced to a second level (VFLOAT) and the charge profile enters the float region 30. The charger maintains the battery in a constant voltage charge mode at the VFLOAT voltage level until the battery is needed to provide back-up power.

There is a second type of conventional charging profile (not illustrated), in which the charging profile stays in the CC region until the battery voltage just touches the boost region voltage level, at which point the voltage applied by the charger is reduced to the float region voltage. Charging at the float region voltage may cause limited evaporation of electrolyte, but the charging is slow. Accordingly, it may take an unacceptably long time to attain a desired state of charge and adequate de-sulphation of the battery electrodes.

SUMMARY OF INVENTION

Conventional charge profiles often require that the power supply used to charge the battery remain uninterrupted for a complete charge cycle in order to optimally charge the battery. In UPS and other applications, power outage timing can often not be predicted and the charging cycle can therefore be randomly interrupted and restarted. As a result, conventional approaches to battery charging may result in various problems with the battery. For example, intermittent charging may result in progressively reducing back-up time due to increased internal resistance of the battery caused by interruption of the charging power before sufficient de-sulphation of the electrodes has occurred, or drying up of the battery electrolyte due to over-charging, which can cause premature failure of the battery. Accordingly, aspects and embodiments disclosed herein are directed to improved systems and methods for charging batteries that address or mitigate these problems.

One embodiment is directed to a method of charging a battery in an uninterruptible power supply system. The method may comprise acts of monitoring an amount of charge supplied by the battery during a discharge cycle, re-charging the battery during a subsequent charge cycle, monitoring charge supplied to the battery during the charge cycle, and ending the charge cycle and placing the battery in a standby mode responsive to the charge supplied to the battery during the charge cycle exceeding the amount of charge supplied by the battery during the discharge cycle.

In one example, re-charging the battery comprises applying a substantially constant voltage of a first value across terminals of the battery. In another example, re-charging the battery further comprises applying a substantially constant current to the battery in an opposite direction of current flow during the discharge cycle of the battery, and suspending application of the substantially constant current when a voltage across terminals of the battery reaches the first value. In another example, placing the battery in the standby mode includes applying a substantially constant voltage of a second value across the terminals of the battery, the second value being less than the first value. Applying the substantially constant voltage of the second value across the terminals of the battery may include applying a voltage with the second value being in a range sufficient to prevent self-discharge of the battery and insufficient to induce evaporation of electrolyte in the battery. The second value may be between, for example, approximately 12 volts and approximately 13.4 volts. The method may further comprise recording a supplied charge value corresponding to the amount of charge supplied by the battery during the discharge cycle. In one example, recording the supplied charge value is performed responsive to termination of the discharge cycle. In another example, monitoring the amount of charge supplied by the battery during the discharge cycle comprises monitoring watt-hours output by the battery, and the method further comprises determining a total watt-hours output by the battery during the discharge cycle. The method may further comprise calculating amp-hours output by the battery from the determined total watt-hours output by the battery during the discharge cycle. The method may further comprise recording the total watt-hours output by the battery during the discharge cycle, wherein calculating the amp-hours output by the battery includes calculating the amp-hours based on the recorded total watt-hours output by the battery during the discharge cycle. The method may further comprise repeating for multiple successive charge and discharge cycles the acts of monitoring the amount of charge supplied by the battery during the discharge cycle, re-charging the battery during the subsequent charge cycle, and monitoring the charge supplied to the battery during the charge cycle.

According to another embodiment, a method of charging a battery in an uninterruptible power supply system comprises supplying power from the battery to a load connected to the uninterruptible power supply during a discharge cycle of the battery, monitoring an amount of charge drawn from the battery during the discharge cycle, at the end of the discharge cycle, re-charging the battery with a substantially constant voltage at a first level during a charge cycle of the battery, monitoring an amount of charge supplied to the battery during the charge cycle, and responsive to the amount of charge supplied to the battery exceeding the amount of charge drawn from the battery during the discharge cycle, reducing the substantially constant voltage to a second level lower than the first level to place the battery in a standby mode. The method may further comprise recording a first value corresponding to the amount of charge drawn from the battery during the discharge cycle. In one example, reducing the substantially constant voltage to a second level lower than the first level to place the battery in a standby mode is performed responsive to the amount of charge supplied to the battery exceeding the first value.

According to another embodiment, an uninterruptible power supply system comprises a battery, a battery charger coupled to the battery and configured to supply power to charge the battery, and a controller coupled to the battery and to the battery charger, the controller configured to monitor and determine a first amount of charge released by the battery while discharging, to monitor a second amount of charge supplied to the battery by the battery charger during subsequent charging of the battery by the battery charger, and to control the battery charger to place the battery in a stand-by mode when the second amount of charge exceeds the first amount of charge.

In one example, the battery charger is configured to deliver a substantially constant current and a substantially constant voltage to the battery. In another example, the battery charger is configured to deliver a substantially constant voltage of a first level to the battery during charging of the battery and a substantially constant voltage of a second level, lower than the first level, when the battery is in the stand-by mode. The second level may be in a range of, for example, approximately 12 volts to approximately 13.4 volts.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

Figure 1:
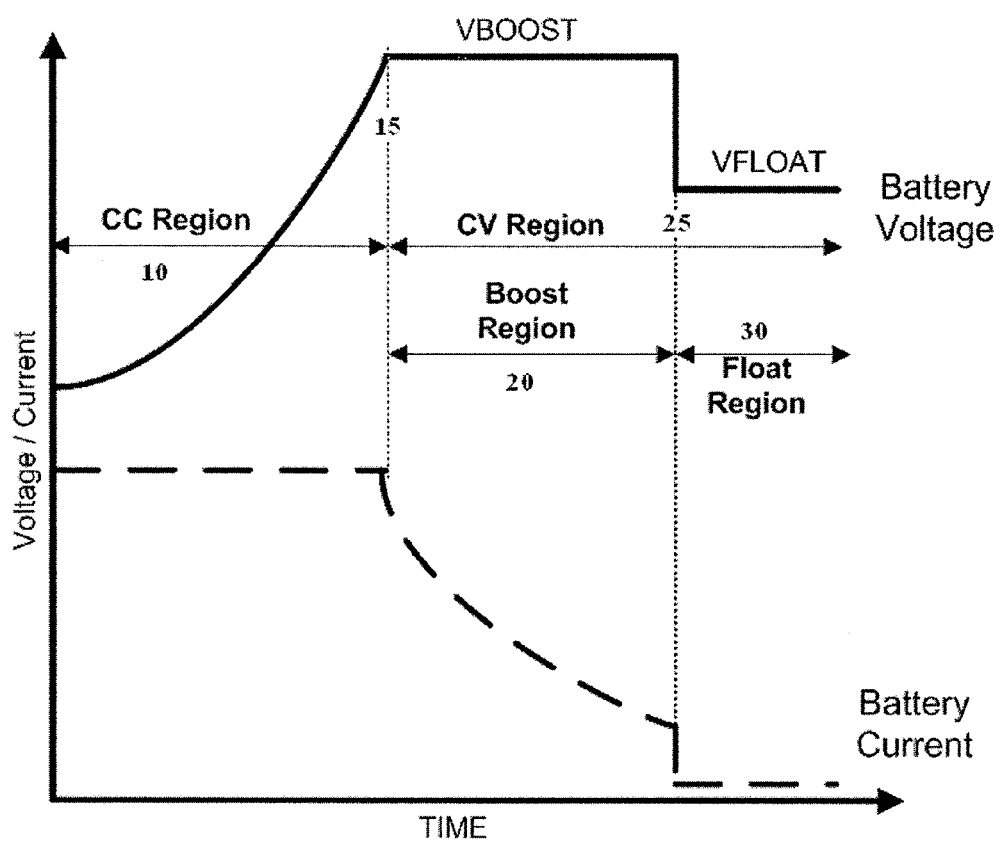
FIG. 1 is an illustration of a conventional charge profile for a battery.

Aspects and embodiments are directed to methods for charging batteries, and to charger systems utilizing those methods. In particular, at least some aspects and embodiments are directed to battery charging methods and apparatus for use in an uninterruptable power supply. As discussed above, conventional charge profiles can cause premature failure of batteries due to overcharging and electrolyte loss and/or reduced charge capacity due to interruption of charging power before sufficient de-sulphation of the electrodes has occurred. Aspects and embodiments of methods for charging batteries and of charger systems utilizing those methods, disclosed herein, may provide for reducing or eliminating these undesirable effects. In particular, some aspects and embodiments may facilitate the reduction in magnitude of undesirable consequences, such as electrolyte drying or charge starvation of some previously known methods of battery charging. As discussed further below, some aspects of methods and apparatus disclosed herein may facilitate providing longer battery lifetimes as well as reducing losses in charge capacity of batteries over multiple cycles of charging and discharging.

It is to be appreciated that embodiments of the methods and apparatus discussed herein are not limited in application to the details of construction and the arrangement of components set forth in the following description or illustrated in the accompanying figures. The methods and apparatus are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Some embodiments are specific to lead-acid batteries used in conjunction with uninterruptable power supply (UPS) systems, however, the methods and charging systems disclosed may be applied to any of a number of battery types, for example, sealed maintenance free batteries, nickel-cadmium batteries, nickel-metal hydride batteries, and lithium ion batteries. The methods and charging systems disclosed may be applied to any of a number of systems employing batteries, for example, UPS systems, automobiles, and consumer electronic devices.

Figure 2:
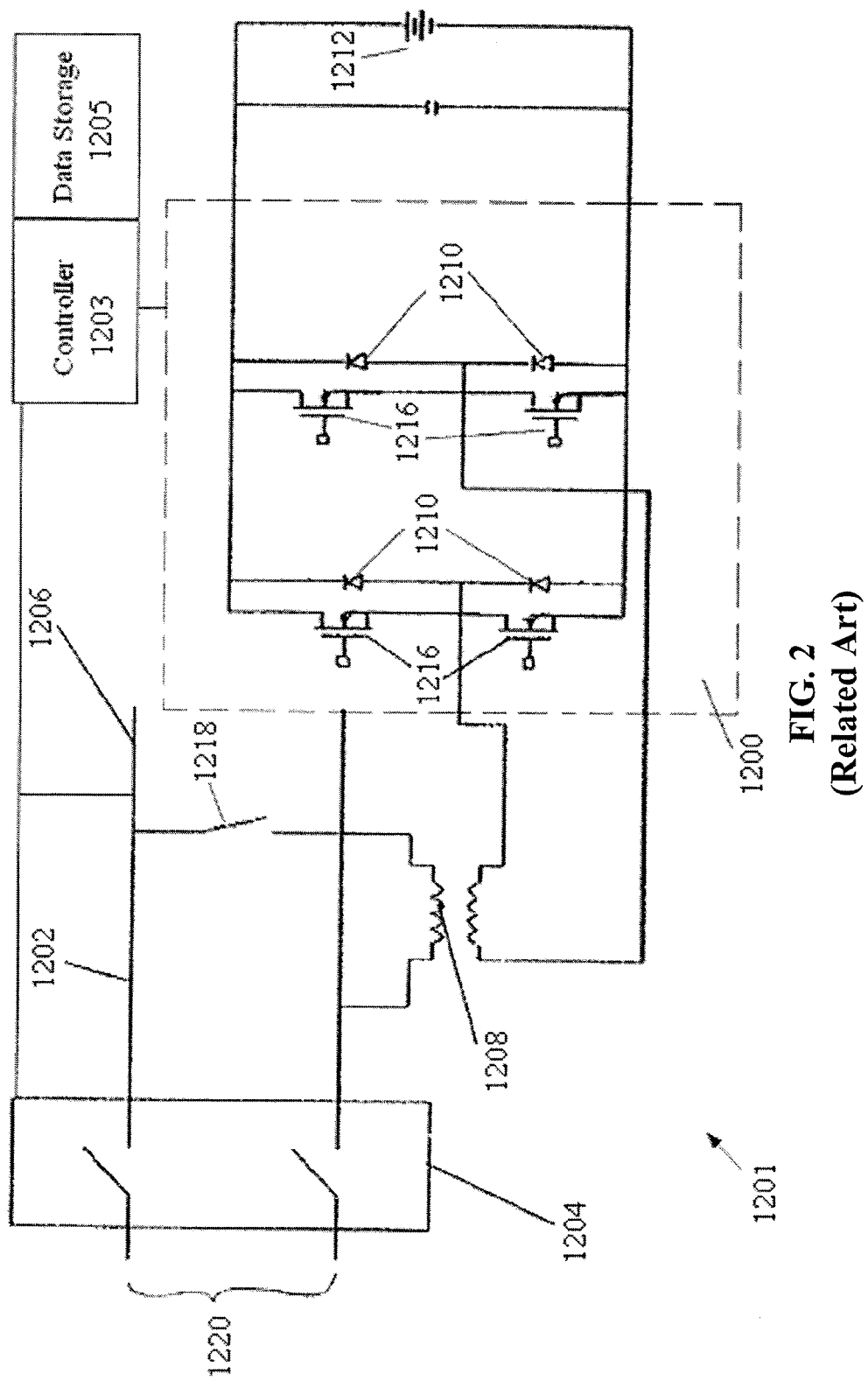
FIG. 2 is a schematic diagram of one example of an uninterruptable power supply (UPS) system.

Referring to FIG. 2, there is illustrated an example of an uninterruptible power supply (UPS) 1201 that may utilize a method of battery charging and discharging according to embodiments of the present invention. The UPS 1201 includes an inverter 1200 coupled to a power line 1202 of an AC power system. The UPS 1201 includes an AC input line coupled to the power line 1202 which receives an input voltage 1220 (and current) via a transfer relay 1204. The UPS 1201 further includes a transformer 1208, a battery 1212 and an inverter relay 1218. The inverter 1200 includes a plurality of diodes 1210 functioning as a rectifier, and a plurality of Field Effect Transistors (FETs) 1216. The inverter 1200 switches between the battery state and the charger state of operation based on whether the AC input power can support the connected load. When the transfer relay 1204 is closed, the input voltage 1220 is coupled through the power line 1202 to supply an output voltage 1206 to a load (not shown). The input voltage 1220 is also provided via the transformer 1208 to the inverter 1200 when the inverter 1200 is in the charger state of operation, charging the battery 1212. When the input voltage 1220 goes out of tolerance the transfer relay 1204 opens and the inverter 1200 transitions from the charger state to the battery state.

The UPS 1201 may also include a controller 1203. Using data stored in associated memory, the controller performs one or more instructions that may result in manipulated data, and the controller monitors and controls operation of the UPS 1201. The controller 1203 may direct embodiments of the battery charging and discharging methods described in this disclosure. In some examples, the controller may include one or more processors or other types of controllers. In one example, the controller is a commercially available, general purpose processor. In another example, the controller performs a portion of the functions disclosed herein on a general purpose processor and performs another portion using an application-specific integrated circuit (ASIC) tailored to perform particular operations. Examples in accordance with the present invention may perform the operations described herein using many specific combinations of hardware and software and the invention is not limited to any particular combination of hardware and software components.

The UPS 1201 may also include data storage 1205. The data storage stores computer readable and writable information required for the operation of the UPS 1201. This information may include, among other data, data subject to manipulation by the controller and instructions that are executable by the controller to manipulate data. The data storage may be a relatively high performance, volatile, random access memory such as a dynamic random access memory (DRAM) or static memory (SRAM) or may be a nonvolatile storage medium such as magnetic disk or flash memory. In one example, the data storage includes both volatile and non-volatile storage. A user of the UPS is able to configure and control the UPS either through a computer coupled to the UPS or using through a user interface of the UPS itself.

Figure 3:
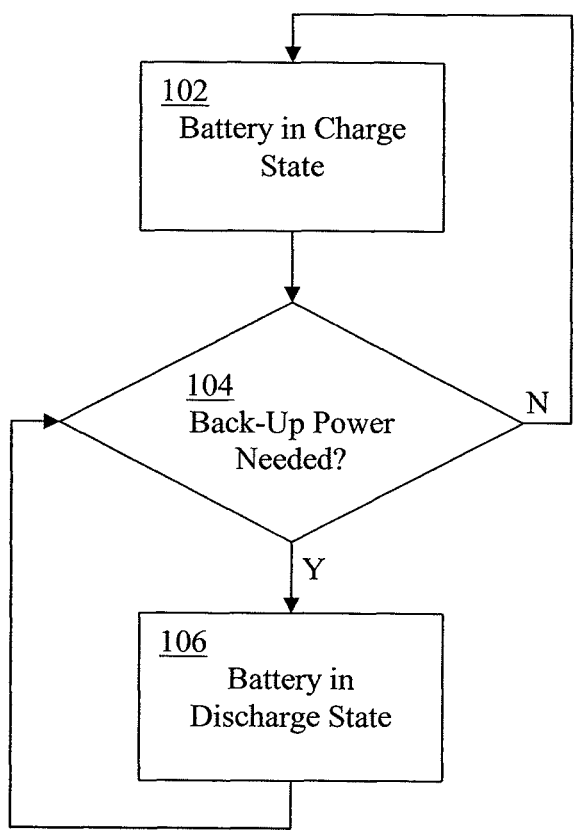
FIG. 3 is a flowchart of one example of a battery charge and discharge cycle.

Referring to FIG. 3, there is illustrated a flowchart of one example of a method of providing back-up power to a system such as a UPS system. In step 102 a battery associated with the UPS system is in a charging state. This charging state is maintained until the battery is needed to provide power to the UPS in the case of, for example, failure of a power line providing power to the UPS or if a need arises for more power than can be supplied by a regular power input to the UPS. In step 104 it is determined if back-up power is required. This determination may be made, for example, by control logic associated with a control module of the UPS. In some aspects a switch to battery back-up may be made automatically by the UPS module when needed without any need for a controller or control logic. If back-up power is needed, the battery goes into a discharge state in step 106 to supply power to the UPS inverter. When it is determined in step 104 of FIG. 3 that back-up power is no longer required, the battery is returned to the charging state in step 102. The determination of when back-up power is no longer required may be made, for example, by control logic associated with a control module of the UPS. In some aspects, the UPS module will automatically return to a battery charging state upon resumption of main power supply without the need for a controller or control logic.

The need for back-up or supplementary power in some cases occurs at unpredictable times. There may be instances where back-up power is not required for long periods of time, or instances when back-up power is required frequently. The period of time for which back-up or supplementary power is required may also vary. In some cases, back-up power may be required only momentarily, and in other instances back-up power may be required for an extended period of time. This sometimes random nature of time intervals between and/or during back-up power supply by a system such as a UPS may in some instances result in a battery charge/discharge profile similar to that illustrated in FIG. 4.

Figure 4:
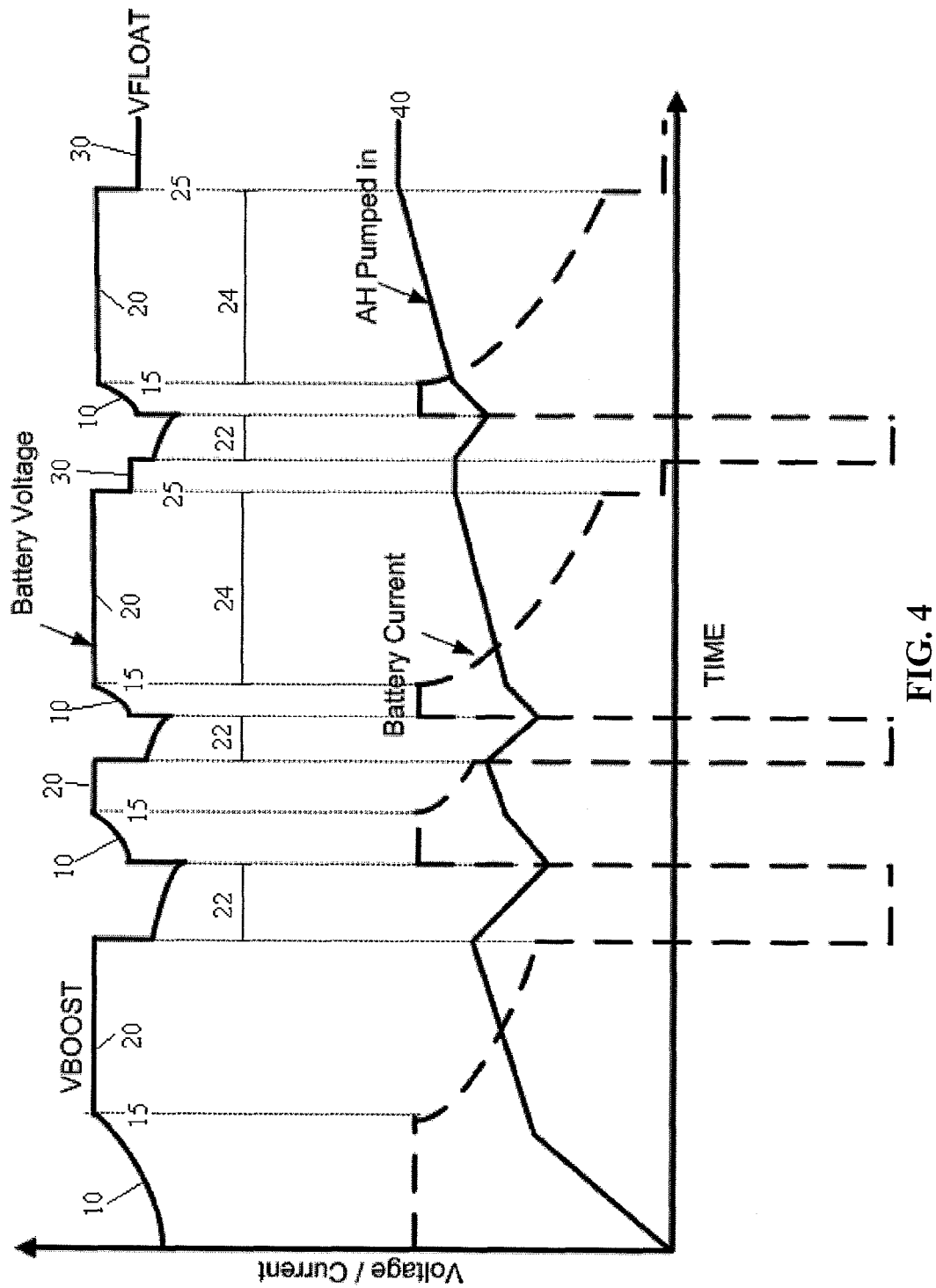
FIG. 4 is a chart showing one example of battery voltage, battery current, and cumulative power pumped into a battery over a series of charge and discharge cycles.

FIG. 4 illustrates a series of four charge cycles and three discharge cycles of varying duration for a battery utilized in a system such as a UPS. In the illustrated example, in the first charge cycle the battery experiences a constant current charge region 10, transitioning to a boost voltage charge region 20 at time 15. Before the battery completes the boost region charging and enters float region charging, a need for back-up power arises and the battery discharges for the time period 22. During this discharge time period 22, the voltage across the terminals of the battery drops and the current flowing into the battery goes negative, indicating that the battery is discharging. At the end of the first discharge period 22, the battery returns to charging by entering a second constant current charge region 10 followed by a second boost region 20. This second charge cycle is also interrupted by a discharge time period 22 before the charge cycle transitions to float region charging. In the third and fourth charge cycles, the battery completes a pre-determined time period 24 in boost region charging and transitions at time periods 25 to float region charging.

As discussed above, some of the problems associated with conventional charging methods arise due to under-charging or over-charging of the battery in situations where the charger power supply is unreliable, such as illustrated in FIG. 4. Line 40, AH Pumped In, in FIG. 4 is a measure of the cumulative electrical charge delivered to the battery. An ampere-hour (AH) is a unit of electric charge. One ampere-hour is equal to 3600 coulombs (ampere-seconds), and is the electric charge transferred by a steady current of one ampere for one hour. As indicated by the rise in the ampere-hours pumped in (AH Pumped In; line 40) over time, in the example illustrated in FIG. 4, more charge is returned to the battery during the charge cycles than is removed during the discharge cycles. The extra energy introduced by this "over-charging" of the battery may be converted into heat and/or chemical energy that may result in boiling and/or evaporation of battery electrolyte. This may lead to decreased performance and eventually damage to the battery. Similarly, if the battery were to be undercharged, indicated by line 40 decreasing over time (not shown in FIG. 4), the internal resistance of the battery may increase over time, as also discussed further below, resulting in shortened useful lifespan of the battery.

In accordance with some aspects and embodiments of methods and apparatus disclosed herein, charge or energy flow out of a battery during the discharge cycle is monitored and recorded, and used to determine an amount of charge or energy that should be provided to the battery during the charging cycle. This approach is referred to herein as "charge balancing." The technique can be applied irrespective of the type of charger or the capacity of the battery connected to it. As discussed further below, charge balancing can reduce the problems of over-charging or under-charging the battery, and mitigate the negative effects associated therewith. Methods according to the present disclosure may result in an at least partial suppression in the progressive reduction in the backup time observed using conventional charge profiles. These methods may also facilitate reducing the amount of electrolyte loss and damage to batteries as compared to conventional charge methodologies. As discussed further below, at least some methods according to the embodiments and aspects disclosed herein are adaptive to the charge state of the battery and hence facilitate a reduction in overcharging or undercharging due to the random occurrences of charging and discharging of the battery.

The equations below represent the chemical reactions that occur during charging and discharging of a lead-acid battery. During the charging of the battery, electrolysis causes recombination of $SO_4^{2-}$ (sulphate ions) present in $PbSO_4$ (lead sulphate) deposited on to the electrodes to $H_2SO_4$ (sulphuric acid). This process is called de-sulphation. During discharge, an opposite reaction takes place. On the negative electrode plates of the battery, sulphate ions present in solution in the electrolyte combine with lead on the electrode plates to form lead sulphate and release electrons. On the positive electrode plates, the electrons are absorbed in a reaction in which sulphate ions in the electrolyte combine with lead dioxide on the electrode plate and hydrogen ions from the electrolyte to form lead sulphate on the electrode plate and water which is released into the electrolyte. The overall discharge reaction results in sulphate ions being removed from the electrolyte to form lead sulphate on the battery electrodes.

During Discharge:
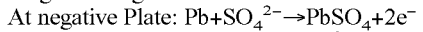
At negative Plate: $Pb + SO_4^{2-} \rightarrow PbSO_4 + 2e^-$
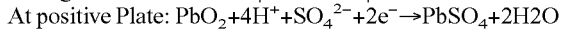
At positive Plate: $PbO_2 + 4H^+ + SO_4^{2-} + 2e^- \rightarrow PbSO_4 + 2H_2O$
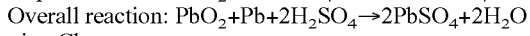
Overall reaction: $PbO_2 + Pb + 2H_2SO_4 \rightarrow 2PbSO_4 + 2H_2O$ During Charge:
At negative Plate: $PbSO4 + 2H^+ + 2e^- \rightarrow H_2SO_4 + Pb$
At positive Plate: $PbSO_4 + 2H_2O \rightarrow PbO_2 + H_2SO_4 + 2e^- 2H^+$
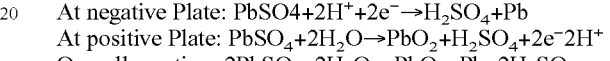
Overall reaction: $2PbSO_4 + 2H_2O \rightarrow PbO_2 + Pb + 2H_2SO_4$ Conventional charger profiles suggested by many battery manufacturers often do not charge the battery adequately because these charger profiles require a long continuous power supply to optimally charge a battery. As discussed above, the duration for which a battery may be utilized to supply power can not always be predicted, particularly in UPS applications. If a battery is not fully discharged before being returned to a charging state, net charge or ampere-hours (AH) that is pumped in to the battery progressively increases over different charge and discharge cycles, resulting in extra energy being pumped in to the battery. As discussed above, a part of this extra energy may contribute to boiling or evaporation of electrolyte. This causes drying up of battery electrolyte and eventually may cause premature damage to the battery.

In practice, the average duty cycle of power interruption for many UPS applications is reported to be higher than the time required to fully charge the battery with sufficient de-sulphation using conventional charge profiles. From the field, it is reported that some UPS systems progressively lose backup time capacity when conventional charging profiles are used to charge the associated batteries. It has been found that progressive increment in internal resistance is the reason for the backup time capacity reduction.

It has been observed that for some UPS systems including lead-acid batteries which were charged with a form of the conventional charge profile discussed above decreased back up power and electrolyte drying problems began to appear after the fifth month of installation of new batteries. In one case, it was observed that the useful back-up time available from a UPS system (model number HI800SQ from APC, including Prestolite PM12000 12V-120AH batteries) utilizing a form of the conventional charge profile discussed above decreased from 91 minutes to 71 minutes after only five charge-discharge cycles.

It has also been observed that during the boost region in a conventional charging profile, there is often a loss of electrolyte. The loss of electrolyte may be caused by overcharging of the battery in the boost region. Excess energy added to a battery during boost region charging may result in electrolyte boiling. Hence, the battery manufacturers suggest that, once the charging in the boost region has been performed for a pre-determined time period, the charger voltage should be dropped down to a level that is only slightly higher than the open circuit voltage of a fully charged battery. This region of operation is called the float mode region, as discussed above. In some instances, the pre-determined time period recommended by a battery manufacturer for boost charging may be more than is necessary to fully charge a partially charged battery. As a result, significant electrolyte boiling may occur because the battery receives excess charge or is held at a high voltage level for too long.

Former approaches to battery charging may have either a problem of progressively reducing backup time in a UPS due to an increase in internal impedance of the battery caused by build up of lead sulphate on the battery electrode plates over time due to incomplete charging or drying up of electrolyte due to over charging. Aspects and embodiments are directed to a "charge balance" approach to battery charging, as discussed above, that may mitigate these effects.

As can be seen from the above equations, the absolute charge level of a lead-acid battery may be determined by a measurement of the concentration of $SO_4^{2-}$ ions in solution in the battery electrolyte. This may be accomplished by measuring the specific gravity of the electrolyte. However, a measurement of the specific gravity of a battery electrolyte may often be inconvenient. The process often involves opening of the battery casing to access the battery electrolyte and removal and analysis of a portion of the battery electrolyte. Thus, a method of measuring the charge state of a battery or of charging a battery to at or near full capacity that does not require a direct measurement of the specific gravity of the battery electrolyte may be in some instances desirable.

Figure 5:
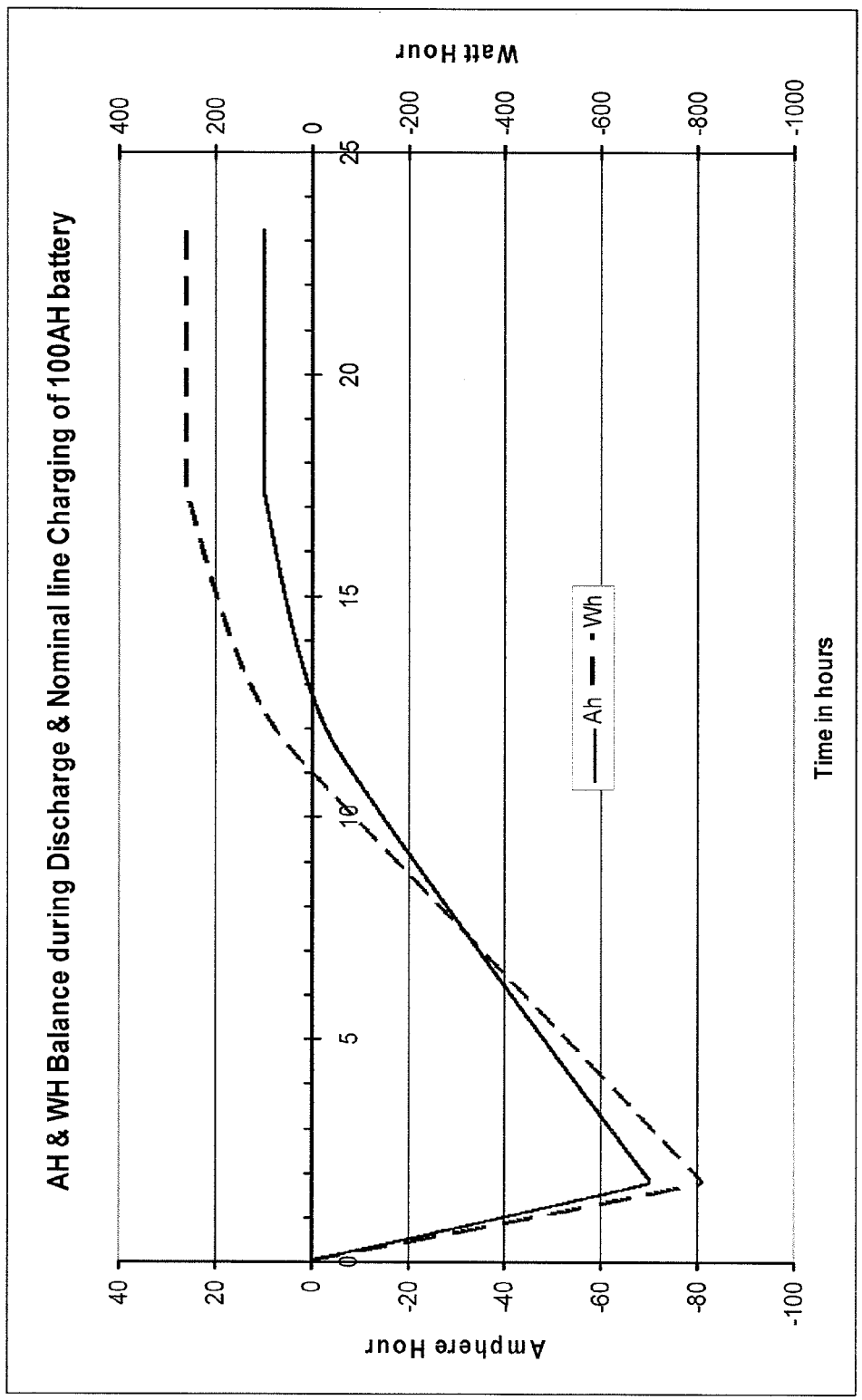
FIG. 5 is a chart illustrating a correlation between amp-hours and watt-hours during discharging and charging of a battery according to aspects of the present invention.

A direct measure of charge output or input from a battery may be obtained by measuring the ampere-hours (AH) output or input from the battery. In instances where a system is incapable of directly measuring AH flowing into or out from a battery, alternate measurements, such as watt-hours (WH) output or input from the battery may be used to calculate the charge output or input from the battery. If the energy (WH) available at the input of the charger is multiplied by charging efficiency, the energy supplied to the battery, namely the watt-hours (WH) supplied to the battery, may be calculated. In some instances or for some batteries, WH may not correlate linearly with AH. Thus, in order to calculate the charge output or input from the battery from a measurement of WH, a relationship between WH output or input and AH output or input may be experimentally determined for a particular battery or battery type. For example, FIG. 5 illustrates how WH and AH are related for a Prestolite model PM12000 12V-120AH battery.

In systems wherein neither WH or AH are available to be measured during a charge cycle of a battery, voltage across the terminals of the battery may be monitored during a constant current charge cycle and this voltage may be experimentally correlated to the amount of charge in the battery. For charging at a certain boost region voltage level, the amount of charge delivered to the battery may be experimentally correlated with the time that the battery is charged at that boost region voltage level. This may allow total charge delivered to a battery during a charge cycle to be determined on the basis of a voltage across the terminals of the battery and the charging time.

Figure 6:
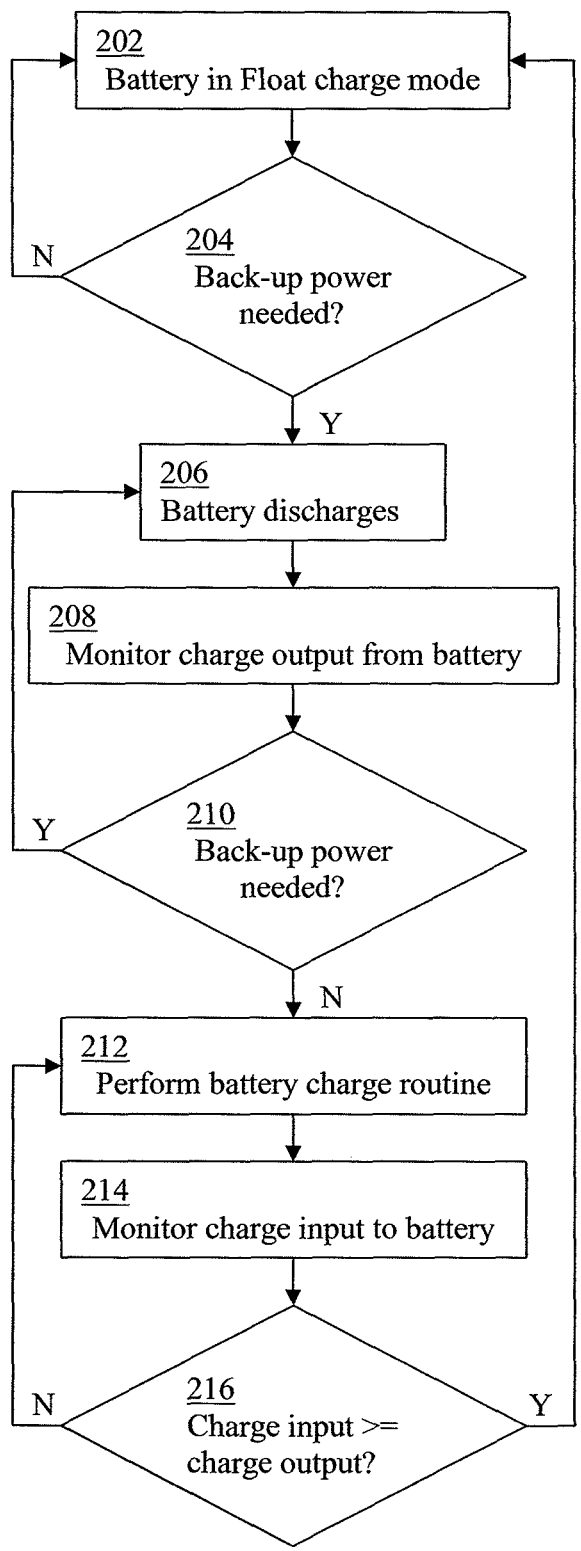
FIG. 6 is a flowchart of one example of a method for charging a battery according to aspects of the present invention.

Referring to FIG. 6, there is illustrated a flow diagram of one example of a battery charge/discharge method implementing a charge balancing approach according to aspects and embodiments of the present invention. At step 202, a battery or group of batteries is in a standby "float-region" charge mode, awaiting use for back-up power. In step 202, the batteries are supplied with a voltage referred to as the "float voltage." The float voltage level may be selected to be a level sufficient to counteract the effects of self-discharge and "current leak" of a battery, but low enough to keep electrolyte evaporation at a low level or to prevent electrolyte loss completely. In one example, the float voltage level is selected to be high enough such that sufficient current is provided to the batteries to make up for any charge lost to self-discharge, thereby reducing or eliminating self-discharge of the batteries over time, but low enough so as to not induce electrolyte boiling. In one example in which the method was implemented using an AMCO model 6 UPS 80F 12V-80AH lead-acid battery, electrolyte boiling was experimentally observed to begin when a charging voltage of approximately 13.4 volts was applied to the battery. Thus, for this battery type, a float voltage of less than 13.4 volts may be appropriate. Similarly, an acceptable float voltage level may be determined for different battery makes, models, or types experimentally, for example, by observing at what voltage level electrolyte boiling begins. In batteries which generally would not experience electrolyte boiling, e.g. batteries with solid or gel-like electrolytes, a float voltage level sufficient to prevent self-discharge of the battery may be selected.

At step 204, a UPS controller for the system with which the battery or batteries are associated makes a decision as to whether or not back-up power is required. The controller may check if back-up power is required on a periodic basis, may check continuously, or may be alerted by another sub-system of a fault condition requiring the initiation of back-up power when such a condition occurs. In some aspects, no controller is required, but rather the system with which the battery or batteries are associated automatically switches over to battery backup upon interruption of a primary power supply or when more power is required than may be supplied by the primary power supply. If no back-up power is required, the batteries remain in float region charge mode of step 202. If back-up power is required, the battery/batteries begin supplying power and discharging in step 206.

As discussed above, in one embodiment, a battery charging method is based on a charge balancing approach which involves monitoring the amount of charge leaving a battery during discharge and replacing that same amount of charge (or a similar amount, as discussed further below) during the charge cycle. Accordingly, as the batteries are discharging in step 206, the amount of charge output from the battery or batteries is monitored in step 208 and optionally recorded. For simplicity and clarity, the following discussion may refer primarily to monitoring the "charge" output from the battery and replacing the "charge" during the charging cycle. As discussed above, the charge flow may be monitored directly by measuring ampere-hours pumped in or drawn from the battery, or may be determined from a measurement of watt-hours or battery voltage in combination with charge/discharge time. Accordingly, reference to monitoring "charge" as used herein is not limited to a direct measurement of actual charge, but is intended to refer generally to any direct or indirect measurement/calculation of battery charge, energy or power that may be used in the charge-balancing techniques disclosed herein.

Still referring to FIG. 6, the battery discharge continues until, in step 210, it is determined that back up power is no longer required. As discussed above, the determination as to whether or not battery power is required may be made by the associated controller, or may be automatic. In one embodiment, an additional check may be made in step 210. Specifically, the voltage supplied by the batteries may be checked to determine whether the batteries are capable of continuing to supply a required amount of power, or whether the batteries have discharged to a point where excessive sulphation of the battery electrodes or damage to the battery due to over-discharging may be possible. According to some embodiments, a minimum operating shutdown voltage is fixed to limit the thickness of the sulfate deposited on the electrodes to less than a predetermined thickness. By controlling the minimum voltage to which the battery may discharge, excessive sulphation may be prevented and, because the time that the battery will need to be recharged may be reduced, electrolyte boiling, which occurs when the battery is charged at a high voltage level for a long time, may also be reduced. If in step 210 it is determined that the batteries are either no longer required or no longer capable of safely providing additional back-up power, the batteries enter a charge cycle in step 212.

According to one embodiment, during the charge cycle the total amount of charge supplied to the batteries is monitored (step 214) and compared (step 216) to the amount of charge that was output during the battery discharge cycle. Based on this comparison, the battery may be maintained in the charging cycle until only as much charge as was removed during the discharge cycle has been returned to the battery. In one example, an extra amount of charge to compensate for losses, for example, due to electrical resistance or other factors, is also added. Thus, by monitoring the charge supplied to the battery during the charging cycle, the amount of charge required to compensate for the charge drained during the discharge cycle and bring the battery back to a fully charged state is replaced during the charging cycle. By using this charge balancing approach, under-charging or over-charging of the battery may be prevented, thereby reducing or eliminating the negative effects associated therewith. In one example, the charge balancing approach may result in the battery remaining in the boost region (see FIG. 1) of the charge/discharge cycle for the minimum (or near minimum) time for a particular charge current.

In one embodiment, once the charge input back into the batteries is equal to or greater than the amount of charge that was output from the batteries during the preceding discharge cycle, the battery charging cycle is considered complete, and the batteries are returned to standby charge mode in step 202.

Embodiments of the charge balancing approach to battery charging discussed herein may provide several advantages over conventional charging profiles. For example, by replacing only the charge that was removed from the battery during the preceding discharge cycle (optionally adjusted for losses), overcharging of the battery may be prevented. As discussed above, overcharging of the battery can cause drying of the electrolyte (due to electrolyte boiling) which can cause the battery to progressively provide less back-up time in a UPS or similar setting, and eventually may cause the battery to fail completely. In one example, by limiting the amount of time the battery spends in the boost region of the charge cycle (i.e., being actively charged) electrolyte boiling can be reduced or even prevented. In addition, by monitoring the charge level of the battery, undercharging, which causes a build-up of sulphates on the battery electrodes, can also be prevented. Furthermore, by preventing the battery from discharging below a predetermined minimum voltage level, excessive sulphation may be avoided, in addition to reducing the time needed to recharge the battery, which in turn also facilitates reducing the time the battery must spend in the boost region of the charge/discharge cycle.

The following discussion includes more detailed examples and algorithms for charge balancing battery charging methods and associated apparatus, according to aspects and embodiments of the present invention.

Figure 7:
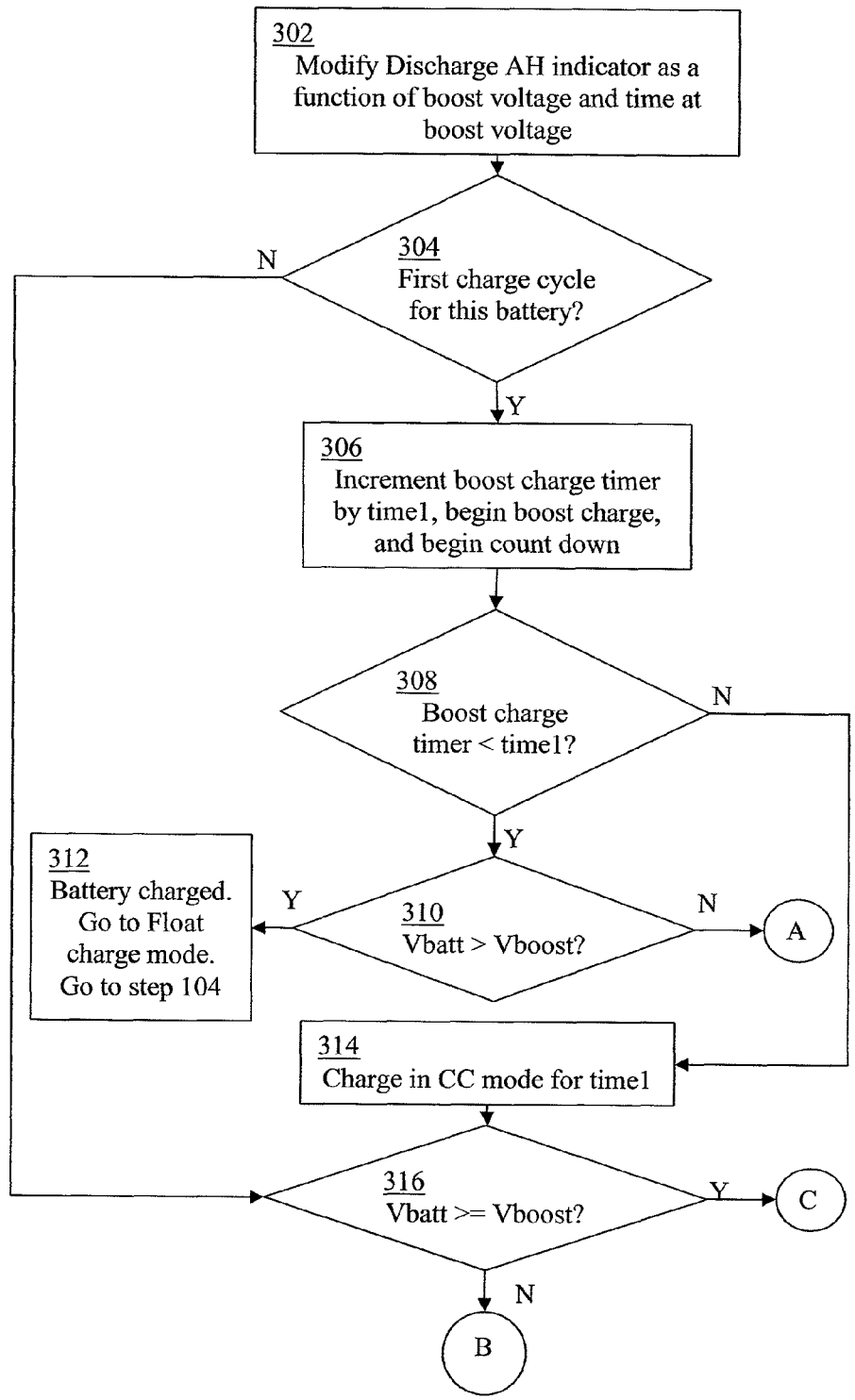
FIG. 7 is a flowchart of a first portion of one example of a method for charging and discharging a battery according to aspects of the present invention.

Referring to FIG. 7, there is illustrated a flowchart of a first portion of one example of a method for charging and discharging a battery according to aspects of the present invention. In step 302, a reference level for the charge of the battery may be set. The following examples may refer to monitoring and/or controlling aspects of the battery charging/discharging cycle based on ampere-hours (AH). As discussed above, total AH added to a battery may be determined by either a direct measurement of time and current flowing into a battery, by a measure of watt-hours (WH) applied to the battery, or by an estimation of WH as a function of voltage applied to the battery and the time for which this voltage was applied; and similarly for AH drawn from the battery during discharge. AH is a relative measurement of the charge state of the battery that is typically unknown at the start of charging. The charge state may be approximated by observation of, for example, the rate at which the battery voltage rises and/or the initial voltage across the terminals of the battery. Thus, step 302 includes setting the reference AH, either based on a known AH pumped in to the battery during the preceding charge cycle, or an estimation.

In one example, step 302 including modifying a Discharge AH indicator. This modification may occur if the battery is returning to the charge cycle from a previous charge cycle. The Discharge AH indicator may be modified for example, by subtracting a total amount of AH that was added to the battery during the previous charge cycle. In the instance that a new fully charged battery is being used, the Discharge AH indicator may be set to an initial value, such as zero. In instances where the battery is entering a charge state after exiting a discharge state, the Discharge AH indicator may be modified in response to an amount of AH that was output from the battery while discharging. If the battery has been charging, and is returning to step 302 after, for example, passing through steps 316 of FIG. 7, step 326 of FIG. 8, and then steps 104 and 102 of FIG. 3, the Discharge AH indicator may be modified in step 302, for example by decreasing the Discharge AH indicator by an amount in proportion to the amount of charge input to the battery since the Discharge AH indicator was last modified.

In step 304 a determination is made whether this is the first charge cycle for the battery. This determination may be made, for example, by a controller capable of determining when a new battery has been added to a system with which the battery is associated. If this is the first charge cycle for the battery, it may not be known what the total charge state of the battery is. For example, the battery may be fully charged, partially charged, or fully discharged. If the battery is fully charged, it may be undesirable to charge the battery for a significant period of time because this may lead to electrolyte boiling and/or battery damage. Thus, if it is determined that this is the first charge cycle for the battery, a boost charge timer is set to a nominal time period, time1, in step 306. This nominal time period time1 is, in some embodiments, set at 20 minutes if it is determined that this is the first charge cycle for the battery. Also in step 306, the current delivered to the battery is set at the constant current region current level and the boost charge counter begins to count down. It was experimentally determined that a desirable charging current level in the constant current region at which batteries such as lead-acid flat plate batteries may be charged is at a current level equal to 1/10 of the battery AH rating.

If the boost charge timer is not less than time1 (step 308), the battery is charged in constant current mode for the time period time1.

According to some embodiments, the boost region voltage level is fixed based on input from the battery manufacturers at a level appropriate for a desired level of de-sulphation. It was experimentally verified that by keeping this level, a consistent backup time capacity after several charge/discharge cycles can be obtained.

If in step 308 it is determined that the boost charge timer is less than the time period time1, e.g. if the battery has already been charging for some time, the voltage across the battery terminals (Vbatt) is compared against the boost voltage (Vboost) (step 310). If the voltage across the battery terminals is greater than the boost voltage, then the battery is considered charged and the battery charge mode is changed to float region charge mode and the method returns to step 104 of FIG. 3 where the battery remains in float region charge mode until needed. If in step 310 it is determined that Vbatt is not greater than Vboost, the method proceeds to step 320 of FIG. 8.

Figure 8:
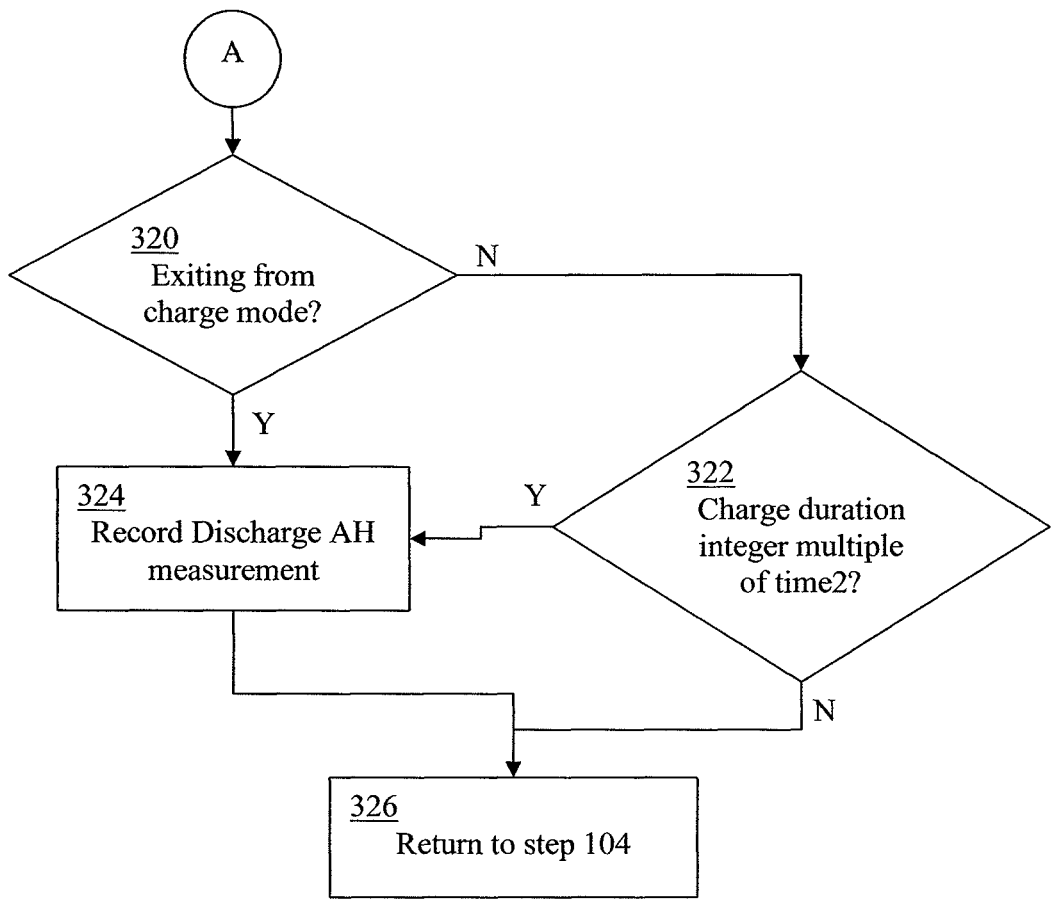
FIG. 8 is a flowchart of a second portion of one example of a method for charging and discharging a battery according to aspects of the present invention.

In step 320 of FIG. 8, the battery charge controller determines if the battery is exiting from a charge mode. If so, then the AH that was delivered to the battery during charging is recorded in step 324. If the method arrived at step 320 from step 310 of FIG. 7, this will generally not be the case, so the method will proceed to step 322. In step 322 the battery charge controller determines if the battery has been charged for a time period that is equal to or greater than an integer multiple of a specified time time2. Time2 may be set at a low level if one desires to finely monitor or control the amount of time the battery will charge for and/or finely monitor or control the amount of charge input to the battery during a charge cycle. In some embodiments, time2 is set to one hour. If the battery has been charging for at least an integer multiple of time2, the AH delivered to the battery is recorded in step 324. The method then moves to step 104 of FIG. 3, and if the battery is not needed to provide back up power, the battery remains in the charge mode, and the method proceeds to step 102 of FIG. 3 and then step 302 of FIG. 7.

Figure 9:
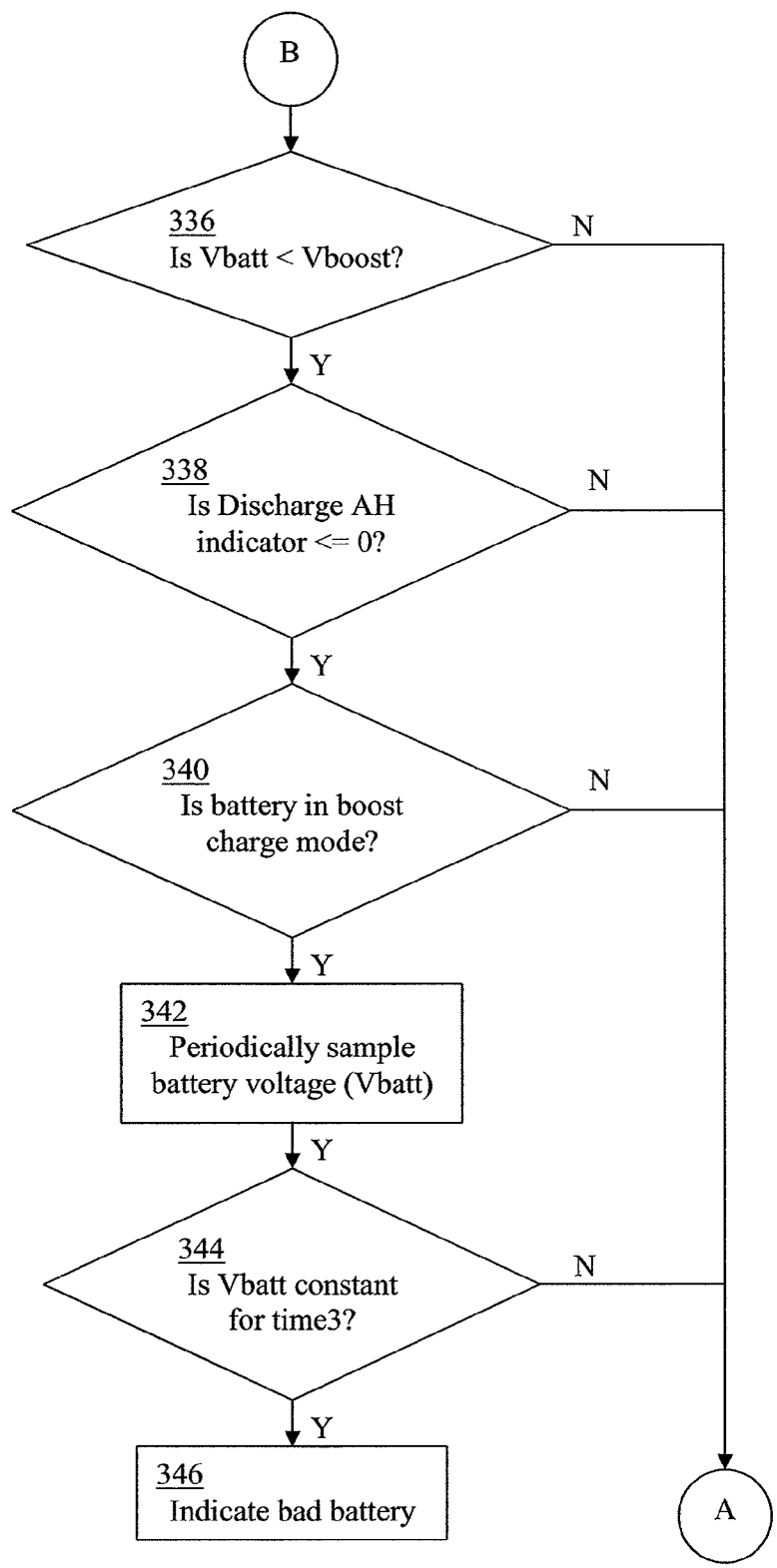
FIG. 9 is a flowchart of a third portion of one example of a method for charging and discharging a battery according to aspects of the present invention.

Returning to FIG. 7, after the battery has been charged for time time1 in step 314, or if it is determined that this is not the first charge cycle for the battery in step 304, the voltage across the terminals of the battery (Vbatt) is compared against the boost region voltage (Vboost) in step 316. If Vbatt is not greater than or equal to Vboost, the method proceeds to step 336 in FIG. 9. In step 336 of FIG. 9, it is verified that Vbatt is less than Vboost. If Vbatt is less than Vboost, the method proceeds to step 338 where it is checked if the entire charge removed from the battery during discharge has been replaced. In some embodiments if the Discharge AH indicator is equal to or less than zero, this is an indication that the entire charge that was removed from the battery during discharge was replaced during charging cycle. In other embodiments, if the Discharge AH indicator is equal to or greater than zero, this is an indication that the entire charge that was removed from the battery during discharge was replaced during charging cycle. If the entire charge output during discharge was replaced during charge, the method moves to step 340, where the controller checks if the battery is in boost charge mode. If the battery is in boost region charge mode, Vbatt is periodically checked (step 342). If the battery voltage Vbatt does not change with additional time charging at voltage Vboost this may be an indication that the battery is damaged or not functioning properly. Thus, in step 344 it is determined whether Vbatt has remained constant for more than a time period time3 while being charged at voltage Vboost. In some embodiments, time3 is set at one hour. If Vbatt is constant for a period of time equal to time3 or greater, the controller indicates that the battery may be bad. If any of the conditions in steps 336, 338, 340, or 344 are not satisfied, the method proceeds to step 320 of FIG. 8 and continues as previously described.

Figure 10:
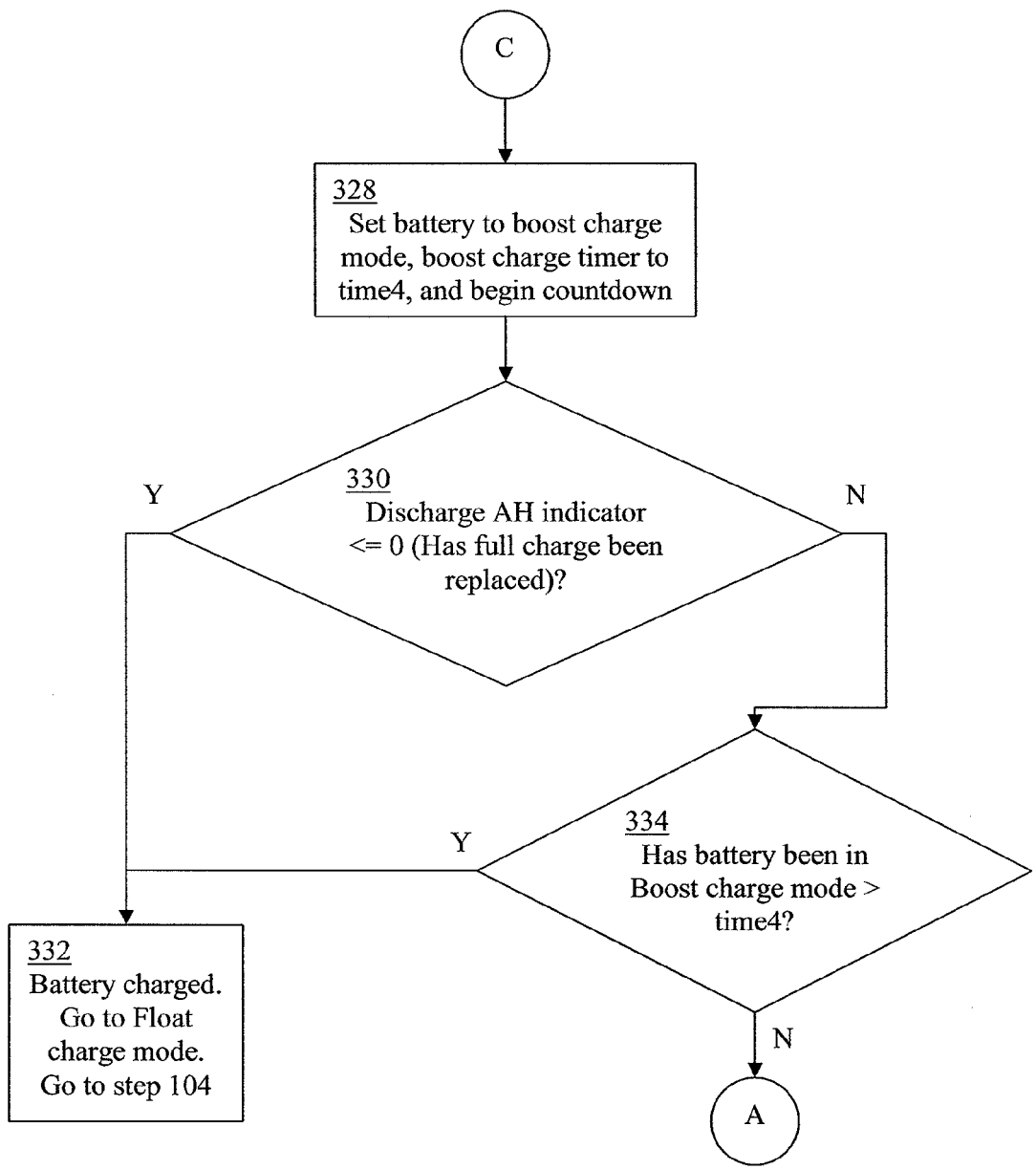
FIG. 10 is a flowchart of a fourth portion of one example of a method for charging and discharging a battery according to aspects of the present invention.

Returning to FIG. 7, if in step 316 it is determined that Vbatt is greater or equal to Vboost, the method proceeds to step 328 of FIG. 10. In step 328 of FIG. 10, a boost charge timer is set. This timer is incremented by time period, time4, for which a battery of the type being charged may remain in boost region charge mode without significant danger of damage due to electrolyte boiling or otherwise. In other embodiments, this timer is set to a time period that is sufficient to fully charge the battery if the battery is fully discharged. For example, for some lead-acid flat plate batteries, the boost charge timer may be set to ten hours. In step 330, the system checks to see if the full charge which was previously output from the battery during a discharge cycle or cycles has been replaced. In some embodiments, this determination may be made by checking if the Discharge AH indicator was less than or equal to zero. If it is determined that the full battery charge has been replenished, the method proceeds to step 332 and the battery is placed in float region charge mode to await use. If in step 330, it is determined that the full battery charge has not been replenished, the method moves to step 334 where it is determined if the battery has been in boost charge mode for a time period greater than time4. If the battery has been in boost charge mode for greater than time4, then the method proceeds to step 332 and the battery is placed in float region charge mode to await use. If the battery has not been in boost region charge mode for greater than time4, then the method proceeds to step 320 of FIG. 8 and proceeds as described above with reference to FIG. 8.

Figure 11:
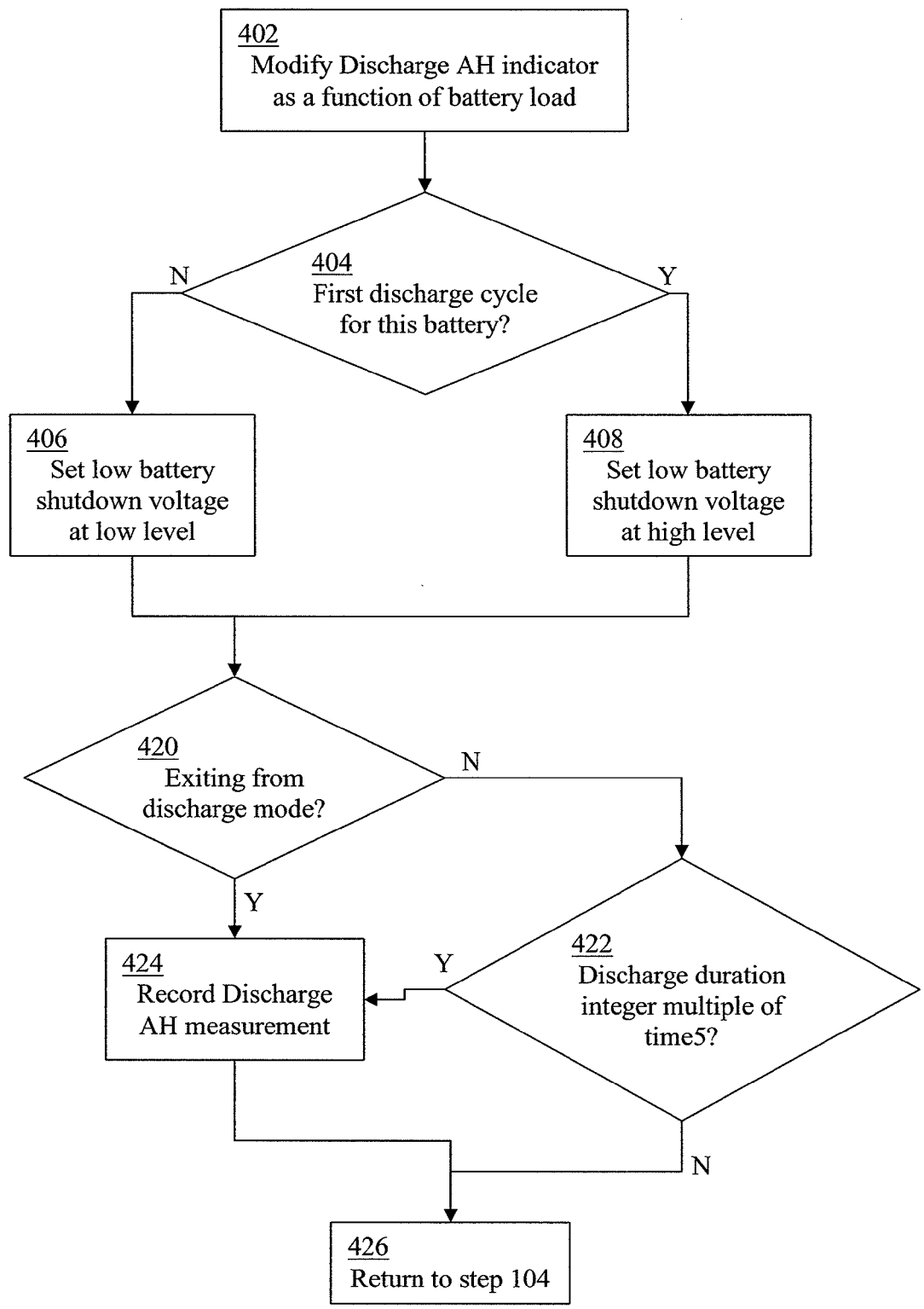
FIG. 11 is a flowchart of a fifth portion of one example of a method for charging and discharging a battery according to aspects of the present invention.

Referring now to FIG. 11, there is illustrated a flow chart of a discharge method for a battery according to some embodiments of the present invention. This method may be utilized in such instances as when a UPS module associated with the battery requires back-up power from the battery. In step 402, the Discharge AH indicator may be modified as a function of battery load, e.g. charge that has flowed out from the battery. If the discharge cycle is just beginning, there may be no need to modify the Discharge AH indicator at this point. If the battery has been discharging, and is returning to step 402 after, for example, passing through steps 426 of FIG. 11 and then steps 104 and 106 of FIG. 3, the Discharge AH indicator may be modified at this point. For example, the Discharge AH indicator may be increased by an amount in proportion to the amount of charge output by the battery since the Discharge AH indicator was last modified.

In step 404 it is determined if this is the first discharge cycle for the battery. This determination may be made, for example, by a controller that capable of determining when a new battery has been added to a system with which the battery is associated. If this is the first discharge cycle for the battery, it may not be known what the total charge state of the battery is. For example, the battery may be fully charged, partially charged, or fully discharged. If the battery is only partially charged, it may be undesirable to discharge the battery for a significant period of time because this may lead to excessive electrode sulphation and/or battery damage. Thus, if it is determined that this is the first discharge cycle for the battery, a low battery shutdown voltage is set to a high level in step 408. The voltage across the battery terminals may be monitored and compared to the low battery shutdown voltage during discharge. If the voltage across the battery terminals drops to the low battery shutdown voltage or below, discharge of the battery may be suspended in order to prevent damage to the battery and/or excessive sulphation of the battery electrodes. In one embodiment, a "safe" high level shutdown voltage that is set for a battery undergoing a first discharge cycle is 11.35 volts. If the battery is not undergoing its first discharge cycle, and/or information is available as to the charge state of the battery, the method proceeds from step 404 to step 406 and the low battery shutdown voltage may be set to a lower level than that in step 408. In some embodiments, this lower low battery shutdown voltage may be 11.1 volts. The low battery shutdown voltage may be set to different levels for different batteries or types of batteries. If the low battery shutdown voltage is set to a lower level, more time in boost region charge mode may be required to acceptably de-sulphanate the battery electrodes as opposed to if the low battery shutdown voltage is set to a higher level After setting the low battery shutdown voltage, the method proceeds to step 420. In step 420, it is determined if the battery is still in discharge mode. If the battery has not exited from discharge mode, the method proceeds to step 422. In step 422 the battery charge controller determines if the battery has been discharged for a time period that is equal to or greater than an integer multiple of a specified time, time5. Time5 may be set at a low level if one desires to finely monitor and/or control the amount of time the battery will discharge for and/or finely monitor or control the amount of charge output from the battery during a discharge cycle. In some embodiments, time5 is set to one hour. If the battery has been discharging for at least an integer multiple of time5, the AH drained from the battery is recorded in step 424. The method then moves to step 426 of FIG. 11 and then to step 104 of FIG. 3. If the battery is still needed to provide back-up power, the battery remains in the discharge mode and the method proceeds to step 104 of FIG. 3 and then step 402 of FIG. 11.

If in step 420 of FIG. 11, if it is determined that the battery is exiting from discharge mode, the AH drained from the battery is recorded in step 424 and the method proceeds to step 426 and then to step 104 of FIG. 3 where the battery may return to charge mode or to discharge mode depending on what is required.

It should be understood that in any of the flowcharts of FIGS. 3, 5, and 7-11 additional steps not illustrated may be included in some embodiments of the present invention. In other embodiments, one or more steps may be removed or replaced. Also, in some embodiments, the sequence of steps may be altered from that illustrated.

Another embodiment of the present invention comprises a battery charger constructed and adapted to perform at least one embodiment of the method disclosed herein. The battery charger may, in some embodiments, be incorporated into a UPS system. The battery charger includes a power input, a constant current supply, and a constant voltage supply. The charger also includes a power flow and/or current flow meter and/or voltage monitor and charge integrator that is capable of monitoring and recording charge flow into and out of a battery. The battery charger also includes a controller. In one example, the controller is a commercially available, general purpose processor. The controller may contain memory in the form of, for example, flash memory or a hard disk or a memory similar to that described above for a UPS module. In another example, the controller performs a portion of the functions disclosed herein on a general purpose processor and performs another portion using an application-specific integrated circuit (ASIC) tailored to perform particular operations. The controller may be capable of converting measurements of voltage and time and/or watt-hours flowing into or out of a battery into amp-hours and may be programmable to adjust a conversion algorithm to one appropriate for a specific battery or battery type that may be used in conjunction with the charger. These components are familiar to those skilled in the art and therefore are not discussed in detail herein.

The constant current supply is capable of supplying a constant or nearly constant current to a battery during a constant current region of a charge profile. The constant current supply may be adjustable so as to be capable of supplying different currents that are appropriate for different batteries or battery types which may be used in conjunction with the charger.

The constant voltage supply is capable of supplying a constant or nearly constant voltage to a battery during a constant voltage region of a charge profile. The constant voltage supply is capable of supplying both a voltage appropriate for a boost region of a charge profile and a voltage appropriate for a float region of a battery charge profile. The voltages that the constant voltage supply is capable of providing may be adjustable so as to be capable of supplying different voltages that are appropriate for different batteries or battery types which may be used in conjunction with the charger.

The battery charger may be stand-alone, or may be integrated into another system. For example, the charger may be integrated into a UPS system, an automobile, an aircraft, or a consumer electronics device. Desired parameters of charging current and voltage may be experimentally determined or optimized for a particular battery or battery type.

The following examples serve to illustrate some of the novel features, aspect and examples of the technology disclosed herein and should not be construed as limiting the scope of the appended claims.

EXAMPLES

Example 1

Figure 12:
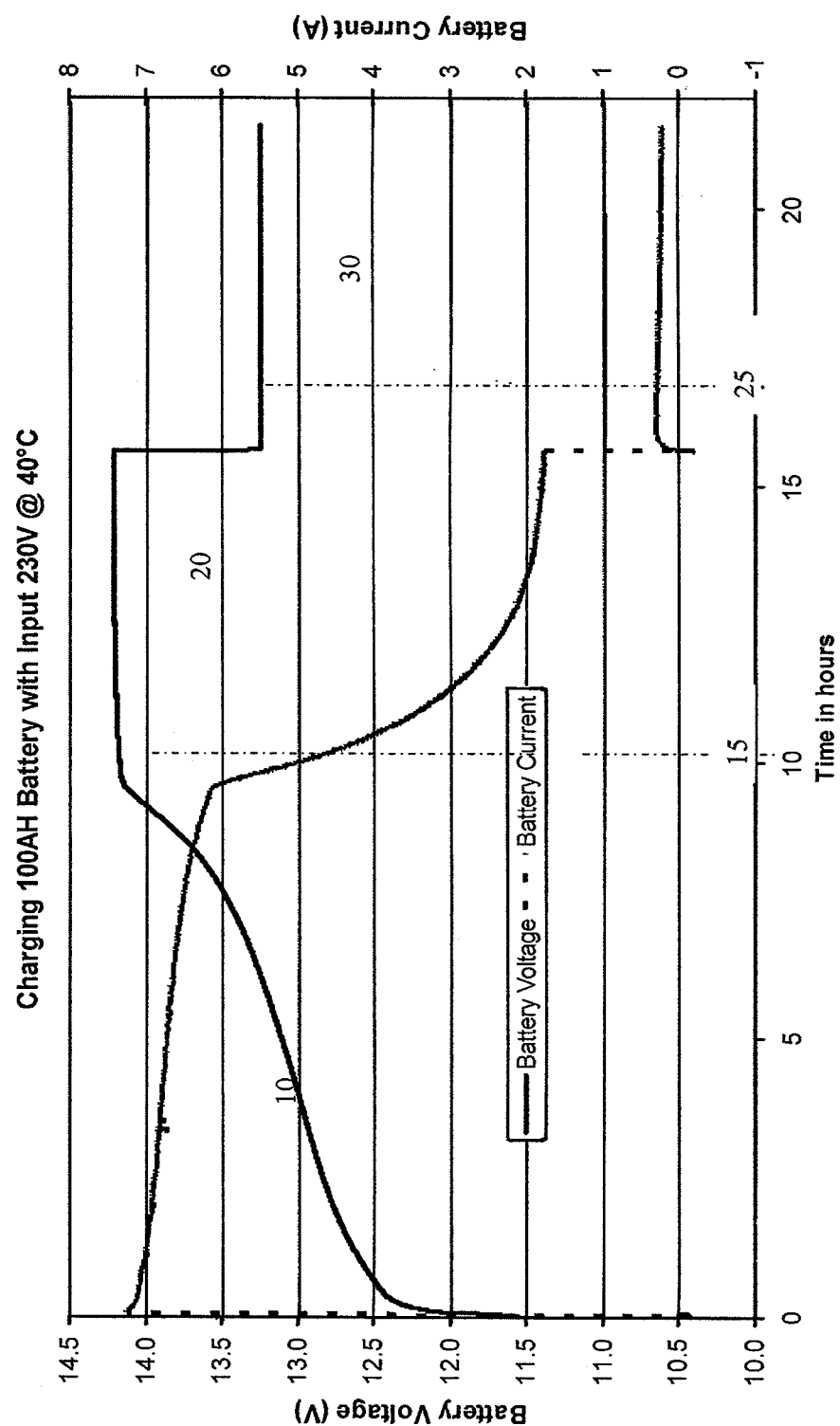
FIG. 12 is an example of a battery charging profile according to aspects of the present invention.

Referring to FIG. 12, there is illustrated a recorded charge profile for a battery when charged according to an embodiment of the present invention. The battery used was a lead-acid flat plate battery. As can be seen from FIG. 12, the battery was charged in constant current mode in region 10 until the battery voltage reached the boost region voltage level chosen for this battery, which in this instance was approximately 14.2 volts. The battery voltage reached this level at time 15, after just under 10 hours of charging in constant current mode. It should be noted that the charger was not able to provide truly constant current to the battery throughout the entirety of the constant current charge mode. The current supplied dropped from just over seven amps to just over six amps over the course of the constant current mode charging.

The boost region charging in region 20 was carried out for just over five hours. This was the amount of time calculated to replace the amount of charge that was depleted from the battery during a previous discharge cycle.

After boost region charging, at time 25, at just over 15 hours of charging, the charging mode was switched to float region charging in region 30. Here, the voltage applied to the battery was held at approximately 13.25 volts, an amount experimentally determined to be sufficient to counteract the effects of battery self-discharge, but insufficient to cause electrolyte boiling. The current applied to the battery in the float region mode was approximately constant at about 0.2 amps.

It will be appreciated by those skilled in the art, given the benefit of this disclosure, that for different batteries or battery types a different charge profile, including, for example, a different constant current region current level and/or different boost region and float region voltages may be more appropriate than those of the profile illustrated in FIG. 12. Appropriate values for the different parameters may be experimentally determined for different batteries or battery types.

Example 2

A test was performed comparing the manufacturer's recommended charging profile to a charging method according to an embodiment of the present invention. The test was conducted using an APC model HI800SQ UPS system, which included Prestolite model PM12000 12V-120AH batteries. It was found that using the charging method according to an embodiment of the present invention the battery back-up capacity may be significantly retained over a number of charge cycles as opposed to the manufacturer's recommended charge method. As can be seen in Table 1 below, using the manufacturer's charging method (the "Old Algorithm") the amount of back-up time available from the battery dropped from 91 minutes to 71 minutes over five discharge/charge cycles. In comparison, using a method according to an embodiment of the present invention (the "New Algorithm"), there was a significantly decreased drop in available back-up time over the same number of charge cycles—a drop of from about 88 minutes to 83 minutes. The drop in available back-up capacity thus dropped approximately 25% as much using the new algorithm than when using the old algorithm over five discharge/charge cycles, a significant improvement.

TABLE 1

| Cycles | Back-Up Time Using Old Algorithm (minutes) | Back-Up Time Using New Algorithm (minutes) |
| --- | --- | --- |
| Cycle-1 | 91 | 88.1 |
| Cycle-2 | 88 | 84.8 |
| Cycle-3 | 83 | 89.3 |
| Cycle-4 | 76 | 82.5 |
| Cycle-5 | 71 | 83 |

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of charging a battery in an uninterruptible power supply system, the method comprising acts of:
    making a determination as to whether the battery is being discharged for a first discharge cycle;
    setting a low battery shutdown voltage at a high non-zero level if the battery is being discharged for the first discharge cycle;
    setting the low battery shutdown voltage at a non-zero level lower than the high non-zero level if the battery is not being discharged for the first discharge cycle;
    monitoring an amount of charge supplied by the battery during a discharge cycle;
    suspending discharge of the battery if a voltage across terminals of the battery drops to the low battery shutdown voltage;
    charging the battery during a subsequent charge cycle;
    monitoring charge supplied to the battery during the charge cycle; and
    ending the charge cycle and placing the battery in a standby mode responsive to the charge supplied to the battery during the charge cycle exceeding the amount of charge supplied by the battery during the discharge cycle.

2. The method as claimed in claim 1, wherein charging the battery comprises applying a substantially constant voltage of a first value across terminals of the battery.

3. The method as claimed in claim 2, wherein charging the battery further comprises:
    applying a substantially constant current to the battery in an opposite direction of current flow during the discharge cycle of the battery; and
    suspending application of the substantially constant current when a voltage across terminals of the battery reaches the first value.

4. The method as claimed in claim 1, wherein placing the battery in the standby mode includes applying a substantially constant voltage of a second value across the terminals of the battery, the second value being less than the first value.

5. The method as claimed in claim 4, wherein applying the substantially constant voltage of the second value across the terminals of the battery includes applying a voltage with the second value being in a range sufficient to prevent self-discharge of the battery and insufficient to induce evaporation of electrolyte in the battery.

6. The method as claimed in claim 4, wherein the second value is between approximately 12 volts and approximately 13.4 volts.

7. The method as claimed in claim 1, further comprising:
    recording a supplied charge value corresponding to the amount of charge supplied by the battery during the discharge cycle.

8. The method as claimed in claim 7, recording the supplied charge value is performed responsive to termination of the discharge cycle.

9. The method as claimed in claim 1, wherein monitoring the amount of charge supplied by the battery during the discharge cycle comprises monitoring watt-hours output by the battery; and
    wherein the method further comprises determining a total watt-hours output by the battery during the discharge cycle.

10. The method as claimed in claim 9, further comprising calculating amp-hours output by the battery from the determined total watt-hours output by the battery during the discharge cycle.

11. The method as claimed in claim 10, further comprising recording the total watt-hours output by the battery during the discharge cycle; and
    wherein calculating the amp-hours output by the battery includes calculating the amp-hours based on the recorded total watt-hours output by the battery during the discharge cycle.

12. The method as claimed in claim 1, further comprising repeating for multiple successive charge and discharge cycles the acts of:
    monitoring the amount of charge supplied by the battery during the discharge cycle;
    charging the battery during the subsequent charge cycle; and
    monitoring the charge supplied to the battery during the charge cycle.

13. A method of charging a battery in an uninterruptible power supply system, the method comprising:
    supplying power from the battery to a load connected to the uninterruptible power supply during a discharge cycle of the battery;
    making a determination as to whether the battery is being discharged for a first discharge cycle;
    setting a low battery shutdown voltage at a high non-zero level if the battery is being discharged for the first discharge cycle;
    setting the low battery shutdown voltage at a non-zero level lower than the high non-zero level if the battery is not being discharged for the first discharge cycle;

monitoring an amount of charge drawn from the battery during the discharge cycle;

suspending discharge of the battery if a voltage across terminals of the battery drops to the low battery shutdown voltage;

at the end of the discharge cycle, charging the battery with a substantially constant voltage at a first level during the charge cycle;

monitoring an amount of charge supplied to the battery during the charge cycle; and responsive to the amount of charge supplied to the battery exceeding the amount of charge drawn from the battery during the discharge cycle, reducing the substantially constant voltage to a second level lower than the first level to place the battery in a standby mode.

14. The method as claimed in claim 13, further comprising:
recording a first value corresponding to the amount of charge drawn from the battery during the discharge cycle; and
wherein reducing the substantially constant voltage to a second level lower than the first level to place the battery in a standby mode is performed responsive to the amount of charge supplied to the battery exceeding the first value.

15. An uninterruptible power supply system comprising:
a battery;
a battery charger coupled to the battery and configured to supply power to charge the battery; and
a controller coupled to the battery and to the battery charger, the controller configured to:
make a determination as to whether the battery is being discharged for a first discharge cycle;
set a low battery shutdown voltage at a high non-zero level if the battery is being discharged for the first discharge cycle;
set the low battery shutdown voltage at a non-zero level lower than the high non-zero level if the battery is not being discharged for the first discharge cycle;
monitor and determine a first amount of charge released by the battery while discharging;
suspend discharge of the battery if a voltage across terminals of the battery drops to the low battery shutdown voltage;
monitor a second amount of charge supplied to the battery by the battery charger during subsequent charging of the battery by the battery charger; and
control the battery charger to place the battery in a standby mode when the second amount of charge exceeds the first amount of charge.

16. The uninterruptible power supply system as claimed in claim 15, wherein the battery charger is configured to deliver a substantially constant current and a substantially constant voltage to the battery.

17. The uninterruptible power supply system as claimed in claim 16, wherein the battery charger is configured to deliver a substantially constant voltage of a first level to the battery during charging of the battery and a substantially constant voltage of a second level, lower than the first level, when the battery is in the stand-by mode.

18. The uninterruptible power supply system as claimed in claim 17, wherein the second level is in a range of approximately 12 volts to 13.4 volts.

19. The method as claimed in claim 1, wherein charging the battery during a subsequent charge cycle comprises charging the battery using a method selected based upon a determination of whether the battery is being charged for an initial charge cycle.

20. The method as claimed in claim 13, wherein charging the battery comprises charging the battery using a method selected based upon a determination of whether the battery is being charged for an initial charge cycle.

21. The uninterruptible power supply system as claimed in claim 15, wherein the controller is further configured to make a determination as to whether the battery is being charged for an initial charge cycle, and charge the battery using a method selected based upon a determination.

* * * * *